June 7, 1927.  1,631,890
F. REDICK
HYDRAULIC SWIVEL HOOK
Filed Feb. 25, 1924
Fig.1.
Fig.2.
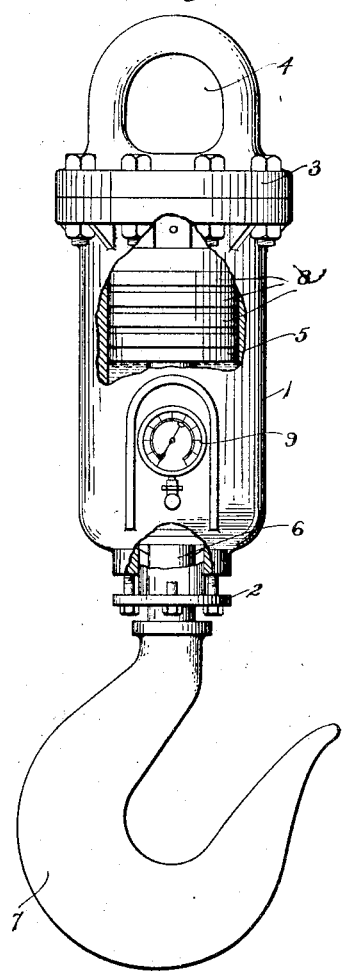
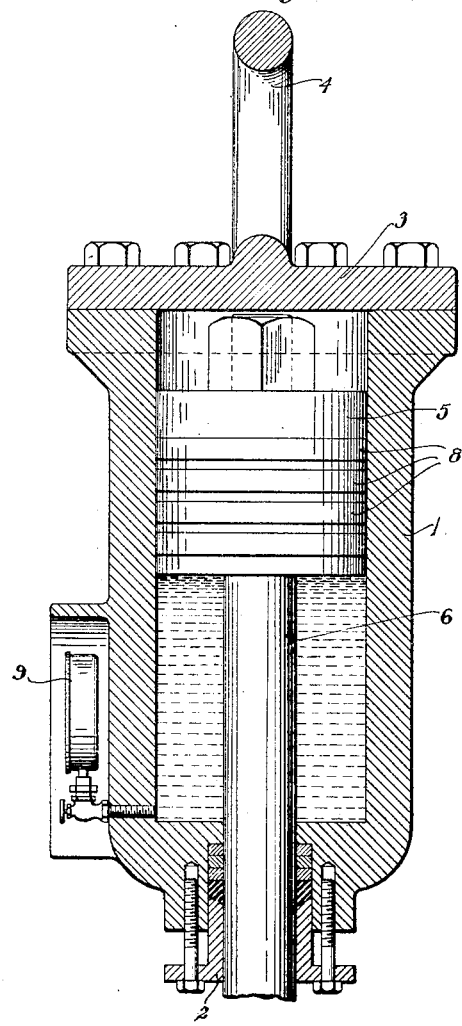
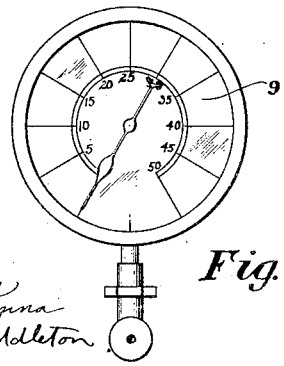
Fig.3.
Frank Redick.
INVENTOR
BY Victor J. Evans.
ATTORNEY
WITNESS:

UNITED STATES PATENT OFFICE.

FRANK REDICK, OF PARKERTON, WYOMING.

HYDRAULIC SWIVEL HOOK.

Application filed February 25, 1924. Serial No. 695,137.

This invention relates to hydraulic swivel hooks, the general object of the invention being to provide means for indicating the pulling strain being exerted upon an object to which the hook is attached so as to avoid damaging the object by too great a strain being exerted upon the same.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawing wherein like characters denote like or corresponding parts throughout the several views, and in which:—

Figure 1 is an elevation with parts broken away, of the improved hook.

Figure 2 is a longitudinal sectional view.

Figure 3 is a view of the gauge.

In these views, 1 indicates the body of the hook which is made in the form of a cylinder, the bottom being closed by a gland 2 and the top by a cap 3 which is bolted to the body and which is formed with the eye 4 for receiving the pulling cable. A piston 5 is arranged in the cylinder and the piston rod 6 passes through the gland 2 and is formed with the hook 7 at its outer end. The piston is provided with the usual rings 8 and a pressure gauge 9 is associated with the cylinder so as to indicate the amount of pressure exerted on the oil in the cylinder by the piston. A substantially U-shaped housing for the gauge and being integrally formed with the cylinder is clearly shown in Figures 1 and 2 of the drawings. The gauge is graduated to read in pounds dead weight instead of pounds per square inch, so that it is possible by looking at the gauge to tell what pull is being exerted on the object which is attached to the hook. The device is mainly intended for pulling casings from oil wells and with this device, by keeping an eye on the gauge, it is possible to limit the pulling strain so as to avoid pulling the casings apart. It will, of course, be understood, however, that the device can be used for other purposes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A swivel hook of the class described comprising a cylinder adapted to contain a liquid and having a central opening at its lower end, a cap detachably arranged upon the upper end of the cylinder, an eye integral with the cap, a piston movable in the cylinder, a stem connected with the piston and passing through the opening, and having a hook on its lower end, a removable gland connected with the bottom of the cylinder and surrounding the stem, an annular outstanding flange on the gland, bolts engaged with the flange and threaded into the end of the cylinder to retain said gland in position, a gauge connected with the bottom of the cylinder so that it will be acted upon by the liquid in the same, and a substantially U-shaped protective housing for the gauge and being formed integral with the cylinder in a manner to overlie and be disposed upon opposite sides of said gauge.

In testimony whereof I affix my signature.

FRANK REDICK.